US008205138B2

(12) United States Patent
Blackmon et al.

(10) Patent No.: US 8,205,138 B2
(45) Date of Patent: Jun. 19, 2012

(54) MEMORY CONTROLLER FOR REDUCING TIME TO INITIALIZE MAIN MEMORY

(75) Inventors: Herman L. Blackmon, Moline, IL (US);
Joseph A. Kirscht, Rochester, MN (US);
Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 12/187,511

(22) Filed: Aug. 7, 2008

(65) Prior Publication Data

US 2010/0037122 A1  Feb. 11, 2010

(51) Int. Cl.
*G06F 11/00* (2006.01)
(52) U.S. Cl. ............ 714/768; 714/6.24; 713/2; 711/166
(58) Field of Classification Search .................. None
See application file for complete search history.

(56) References Cited

U.S. PATENT DOCUMENTS

| | | | | |
|---|---|---|---|---|
| 5,961,660 | A * | 10/1999 | Capps et al. | 714/763 |
| 7,039,657 | B1 * | 5/2006 | Bish et al. | 1/1 |
| 7,185,246 | B2 * | 2/2007 | Cochran et al. | 714/718 |
| 7,194,581 | B2 * | 3/2007 | Vogt | 711/131 |
| 7,275,189 | B2 * | 9/2007 | Ruckerbauer et al. | 714/723 |
| 7,467,323 | B2 * | 12/2008 | Fields et al. | 714/6.2 |
| 7,526,692 | B2 * | 4/2009 | Borkenhagen et al. | 714/724 |
| 7,984,357 | B2 * | 7/2011 | Kirscht et al. | 714/763 |
| 2004/0151038 | A1 * | 8/2004 | Ruckerbauer et al. | 365/200 |
| 2005/0081080 | A1 * | 4/2005 | Bender et al. | 714/2 |
| 2006/0090112 | A1 * | 4/2006 | Cochran et al. | 714/737 |
| 2006/0294335 | A1 * | 12/2006 | Vogt | 711/170 |
| 2008/0256281 | A1 * | 10/2008 | Fahr et al. | 710/305 |
| 2011/0047400 | A1 * | 2/2011 | Blackmon et al. | 713/400 |
| 2011/0066921 | A1 * | 3/2011 | Blackmon et al. | 714/763 |

* cited by examiner

*Primary Examiner* — Christopher McCarthy
(74) *Attorney, Agent, or Firm* — Bockhop & Associates LLC

(57) ABSTRACT

In a method of initializing a computer memory that receives data from a plurality of redrive buffers, a predetermined data pattern of a selected set of data patterns is stored in selected redrive buffers of the plurality of redrive buffers. Each of the selected set of data patterns includes a first initialization data pattern and an error correcting code pattern that is a product of a logical function that operates on the first initialization data pattern and an address in the computer memory. The selected set of data patterns includes each possible value of error correcting code pattern. A redrive buffer of the plurality of redrive buffers that has stored therein an error correcting code pattern that corresponds to the selected address is selected when sending a first initialization data pattern to a selected address. The selected redrive buffer is instructed to write to the selected address the first initialization data pattern and the error correcting code pattern that corresponds to the selected address.

11 Claims, 3 Drawing Sheets

MEMORY CONTROLLER FOR REDUCING TIME TO INITIALIZE MAIN MEMORY

BACKGROUND OF THE INVENTION

1. Field of the Invention

The present invention relates to digital systems and, more specifically to a controller for a digital memory.

2. Description of the Prior Art

Many computer servers use a smart re-power chip connected to main memory to realize large system memory capacities. As memory technology advances and system capacities increase, the initial program load (IPL) time required to initialize all of main memory increases. The smart re-power chips are sometimes used to drive multiple dual in-line memory module (DIMM) loads or, in the case of a fully buffered DIMM, reside on the DIMM itself. The DIMM could be a single rank, dual rank, quad rank, or possibly more than 4 ranks of dynamic random access memory (DRAM) modules.

In existing systems, a smart redrive chip simply passes write commands with data through to the memory DIMMs. With this method, the DIMM bus data and command conflicts needed to be considered when making the decision to dispatch the command and data from the controller. Newer technology allows splitting writes into two transactions. By incorporating data buffering capability within the smart redrive chip, the write commands are split into two commands, one to fill the redrive chip's data buffer and the second to push the data out to the memory DIMM. This allows more efficient scheduling of the command bus by removing the scheduling dependency on the memory bus. Write data can be written to a buffer on the redrive chip, then pushed to the memory DIMM at a later time when it has a lesser effect on memory reads. Because writes are typically not as critical as reads are, and because the data can be filled into the buffers in advance of performing the writes (tucked under other operations), the high speed bus may have a reduced data width that is not capable of streaming continuous memory writes (since typical command traffic will have more reads than writes).

In one example of a redrive chip, the high speed bus from the memory controller to the redrive chip is a combined command/data bus that requires 32 transfers at a 2 Gb/s data rate to fill the buffers. This amount of data requires only four transfers at 533 Mb/s on the memory bus to the DIMMs. Thus, the high speed bus cannot source enough data to stream writes continually.

Therefore, there is a need for a system that sources initialization data to DIMMs in a continuous manner.

SUMMARY OF THE INVENTION

The disadvantages of the prior art are overcome by the present invention which, in one aspect, is a method of initializing a computer memory that receives data from a plurality of redrive buffers. A predetermined data pattern of a selected set of data patterns is stored in selected redrive buffers of the plurality of redrive buffers. Each of the selected set of data patterns includes a first initialization data pattern and an error correcting code pattern that is a product of a logical function that operates on the first initialization data pattern and an address in the computer memory. The selected set of data patterns includes each possible value of error correcting code pattern. A redrive buffer of the plurality of redrive buffers that has stored therein an error correcting code pattern that corresponds to the selected address is selected when sending a first initialization data pattern to a selected address. The selected redrive buffer is instructed to write to the selected address the first initialization data pattern and the error correcting code pattern that corresponds to the selected address.

In another aspect, the invention is an initialization circuit for a computer memory that includes a plurality of redrive buffers and a controller. Each buffer of the plurality of redrive buffers has stored thereon an initialization data pattern and a different error correcting code pattern. Each error correcting code pattern corresponds to a set of addresses in the computer memory. The controller is configured to initialize a selected address in the computer memory by instructing a selected redrive buffer of the plurality of redrive buffers that has stored therein the error correcting code that corresponds to the selected address to write the initialization data pattern and the error correcting code stored therein to the selected address.

In yet another aspect, the invention is a design structure embodied in a machine readable medium used in a design process for an initialization circuit for a computer memory. The design structure includes a plurality of redrive buffers, in which each buffer of the plurality of redrive buffers has stored thereon an initialization data pattern and a different error correcting code pattern. Each error correcting code pattern corresponds to a set of addresses in the computer memory. A controller is configured to initialize a selected address in the computer memory by instructing a selected redrive buffer of the plurality of redrive buffers that has stored therein the error correcting code that corresponds to the selected address to write the initialization data pattern and the error correcting code stored therein to the selected address.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
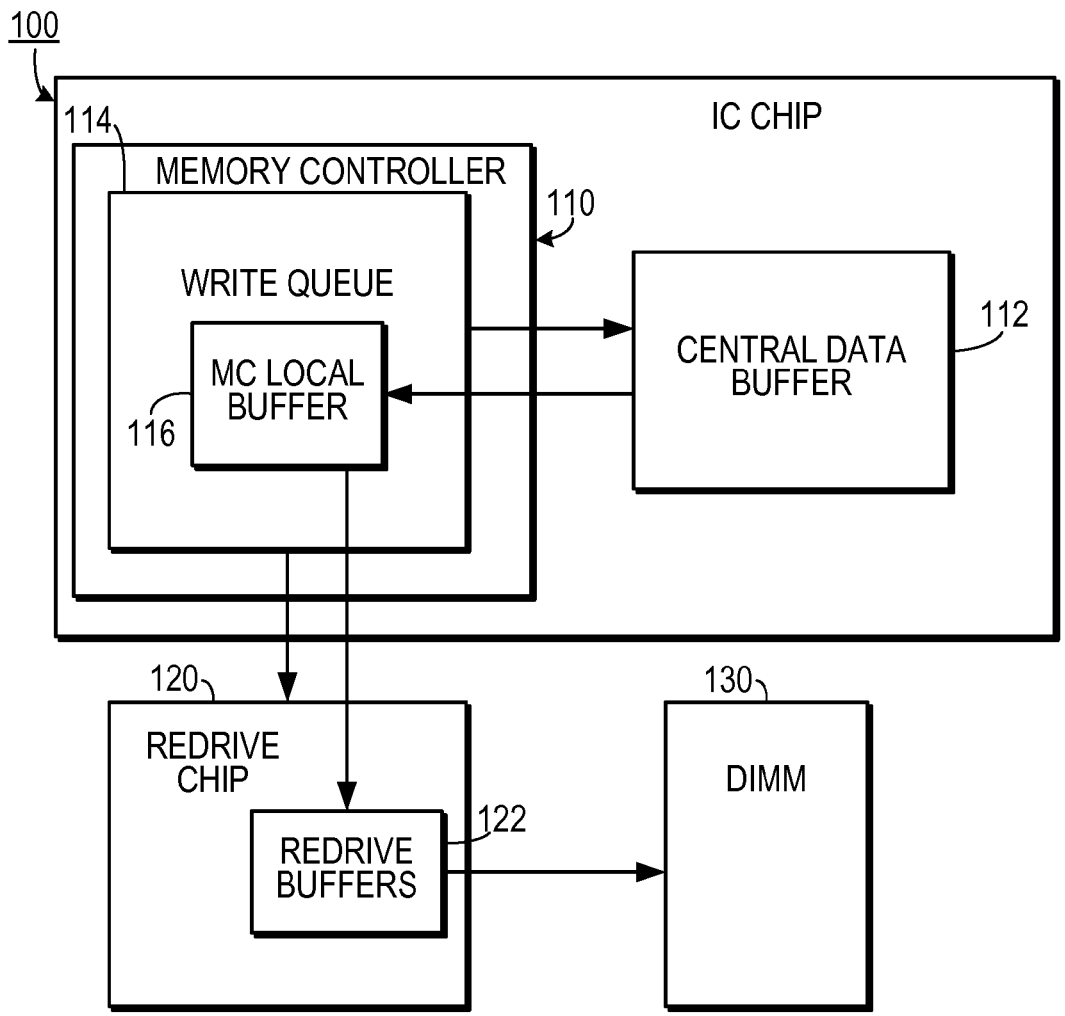
FIG. 1A is a schematic diagram of a circuit including an integrated circuit chip and a redrive chip.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

One commercial embodiment of a memory initialization system includes a chip that employs a structure in which a write command is presented to the memory write queue with the corresponding number of the central data buffers in which the data resides. The Write Queue logic moves the data from the central data buffer to a local data buffer within the write queue. When an opening on the high speed command bus to the smart redrive chip is available, the command to fill the smart redrive chips write buffer is performed and associated data provided.

The memory scrub facility, which is used to perform all of the memory initialization writes to memory, issues write commands to the Write Queue logic. Prior to starting the initialization sequence, several central buffer locations are reserved and then filled with the desired data pattern. The scrub controller is then started and simply walks all Memory Ranks, Rows, Columns, and Internal Banks, presenting the commands to the Write Queue, specifying the central data buffer from which to pull the data. The same central data buffers are simply reused over and over to write the pre-specified data patterns into memory (i.e., there is no buffer request/returns happening during the initialization).

Dynamic Random Access Memory (DRAM) error correction code (ECC) is generated over the data, row address parity, and column address parity prior to sending the data to the Dual In-Line Memory Modules (DIMMs), thus there are four possible ECC patterns for each data pattern which will be dependent upon which DRAM address the data will be stored.

Essentially, the system seeds the desired data pattern with the four different ECC patterns into the Write buffers within the smart redrive chip. During memory initialization, write commands are issued to the Write Queue Logic instructing it not to pull data from the central data buffer to the local buffer within Write Queue, not to write the data to the write buffer within the redrive chip and not to do any smart redrive chip buffer management. It is instructed to perform only the memory write to the DIMMs from one of the four smart redrive buffers. The scrub controller determines the address parity of the write command to which it wishes to perform and supplies the smart redrive buffer number that holds the data with the correct ECC for that address parity.

Since there is no need to source the data continually across the narrow high speed bus for each memory write, the writes to the Memory DIMMs are performed in "back-to-back" or "brickwalled," other than with the refresh commands. In many applications, this will result in substantial time savings during initialization As shown in FIG. 1A, in one representative embodiment, an integrated circuit chip 100 includes a memory controller 110 in communication with a central data buffer 112. The memory controller 110 is typically one partition of several partitions within the chip 100. The central data buffer 112 is in communication with several entities (not shown) on the chip 100 and is located in a peer partition. The memory controller 110 includes a write queue 114 in which resides a memory controller local buffer 116. A redrive chip 120 is in communication with the memory controller 110 and includes a plurality of redrive buffers 122, which are in communication with a plurality of memory modules 130.

The system initializes the memory modules 130 (e.g., during an initial program load routine) by first storing in selected ones of the redrive buffers 122 a predetermined data pattern of a selected set of data patterns.

Figure 1B:
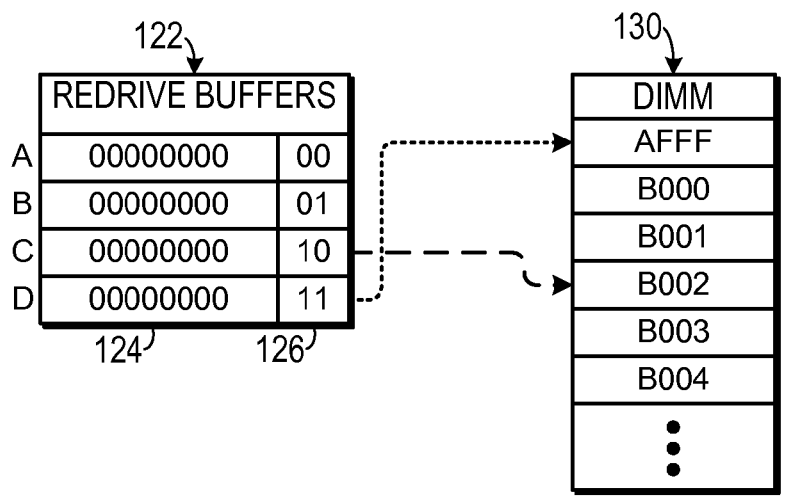
FIG. 1B is a schematic diagram showing assignment of data patterns from a redrive buffer to a memory module.

As shown in FIG. 1B, each of the selected set of data patterns includes a first initialization data pattern 124 and an ECC pattern 126 that is a product of a logical function that operates on the first initialization data pattern 124 and an address in the computer memory. The selected set of data patterns 124 include each possible value of ECC pattern 126 that would be produced by the ECC algorithm being employed for the system.

When sending an initialization data pattern to a selected address, the system selects a redrive buffer (e.g., one of buffers A-D, as shown in FIG. 1B) that has stored therein an ECC pattern that corresponds to the selected address. The system then instructs the selected redrive buffer to write to the selected address the first initialization data pattern and the ECC pattern that corresponds to the selected address. For example, when the system initializes address B002 in the memory modules 130, it commands redrive buffer C to write its contents to address B002. The contents of redrive buffer C include initialization pattern (e.g., 00000000) and the ECC bits (e.g., 10) that would be generated by the ECC algorithm in response to the initialization pattern and address B002. Thus, the system does not need to transfer initialization data from the central data buffer 112 to the memory modules 130, but needs only to pre-store the initialization data in the redrive buffers 122 and command them to write the initialization data to the memory modules 130.

If for example, the system employs two Address Parity bits, then the logical function of the ECC algorithm produces four different error correcting code patterns 126. Thus four different redrive buffers (A-D) store each possible combination of the first initialization data pattern 124 and error correcting code patterns 126.

In some systems, it might be desirable to employ more than one initialization pattern. In such a case, the system would need to store in redrive buffers a second set of combinations of initialization data and ECC bits. For example, if the system were to initialize some memory locations with all "0's" and other memory locations with all "1's" and if the system employed two Address Parity bits, then four redrive buffers would be stored with "0's" and corresponding ECC bits and four more redrive buffers would be stored with "1's" and corresponding ECC bits. It should be understood that certain embodiments might initialize with data patterns other than "1's" and "0's" (e.g., 10101010 might be used) and certain embodiments would use more than two ECC bits.

Figure 2:
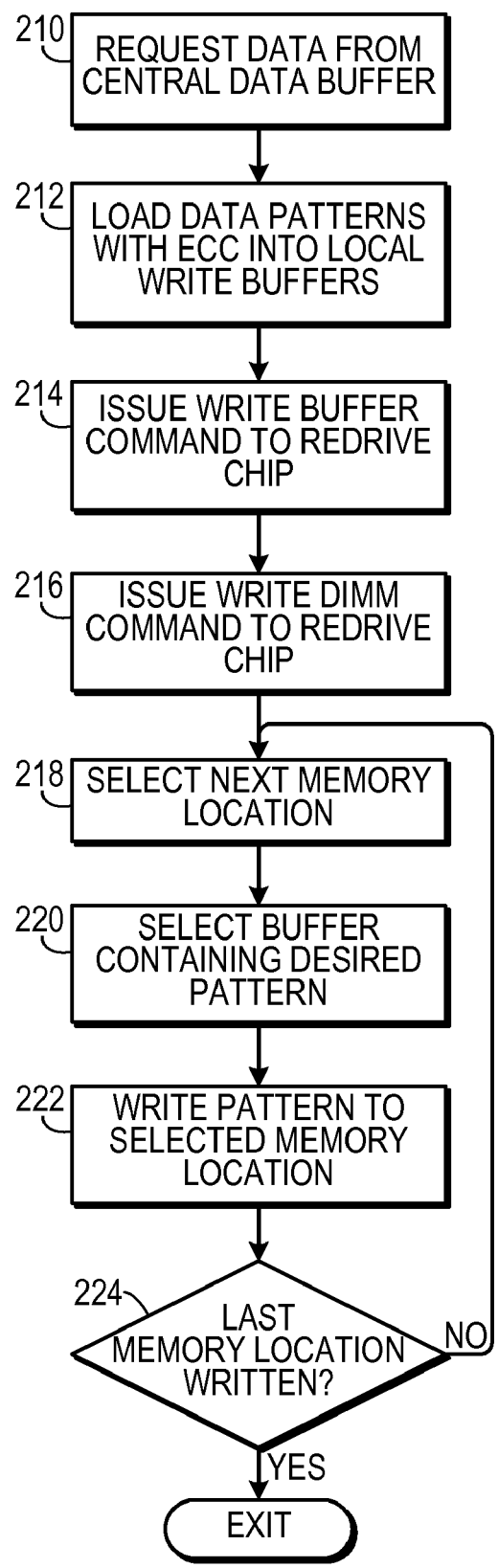
FIG. 2 is a flowchart showing one method of assigning data patterns to a memory location.

As shown in FIG. 2, initialization involves requesting 210 data from the central data buffer. The data patterns (including the ECC values) are loaded 212 into the local redrive buffers. A "write buffer" command is issued 214 to the redrive chip and a "write DIMM" command is issued 216 to the redrive chip. A next memory location is selected 218 and the buffer containing the pattern corresponding to the selected location is selected 220. Then the pattern in the selected buffer is written to the selected memory location 222. The system determines 224 is all memory locations have been initialized and, if not, it returns to action 218.

While one embodiment may result in four combinations of ECC bits, other embodiments could certainly be less or more. Also, any data pattern may be stored as an initialization data pattern. It is not limited to being all "0's" or all "1's", although BIOS typically initializes all memory locations to "0's" prior to loading any code.

Figure 3:
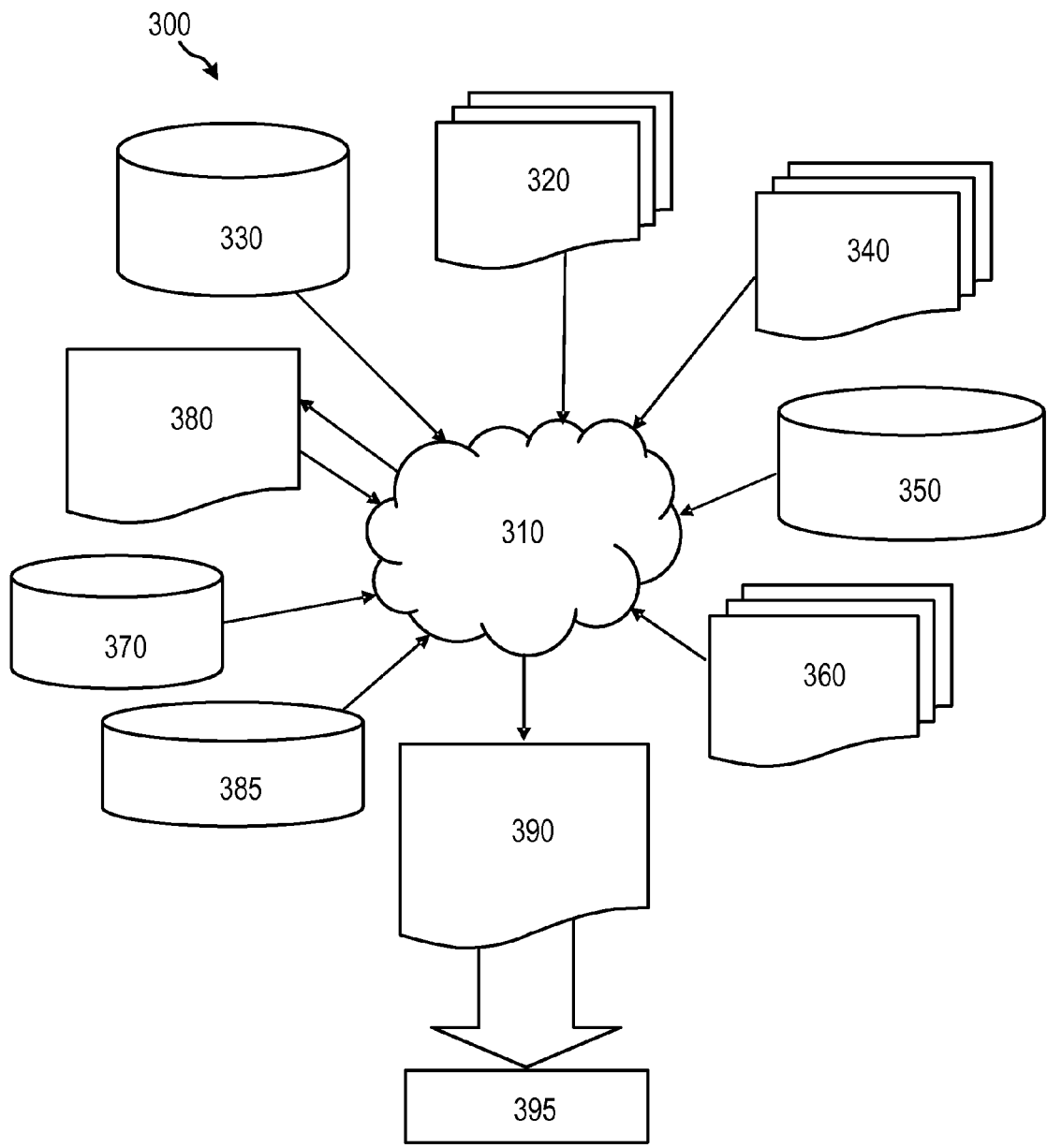
FIG. 3 is a schematic diagram of a design flow.

FIG. 3 shows a block diagram of an example design flow 300. Design flow 300 may vary depending on the type of IC being designed. For example, a design flow 300 for building an application specific IC (ASIC) may differ from a design flow 300 for designing a standard component. Design structure 320 is preferably an input to a design process 310 and may come from an IP provider, a core developer, or other design company or may be generated by the operator of the design flow, or from other sources. Design structure 320 comprises circuit 100 (shown in FIG. 1A) in the form of schematics or HDL, a hardware-description language (e.g., Verilog, VHDL, C, etc.). Design structure 320 may be contained on one or more machine readable medium. For example, design structure 320 may be a text file or a graphical representation of circuit 100. Design process 310 preferably synthesizes (or translates) circuit 100 into a netlist 380, where netlist 380 is, for example, a list of wires, transistors, logic gates, control circuits, I/O, models, etc. that describes the connections to other elements and circuits in an integrated circuit design and recorded on at least one of machine readable medium. This may be an iterative process in which netlist 380 is resynthesized one or more times depending on design specifications and parameters for the circuit.

Design process 310 may include using a variety of inputs; for example, inputs from library elements 330 which may house a set of commonly used elements, circuits, and devices, including models, layouts, and symbolic representations, for a given manufacturing technology (e.g., different technology nodes, 32 nm, 45 nm, 90 nm, etc.), design specifications 340, characterization data 350, verification data 360, design rules 370, and test data files 385 (which may include test patterns and other testing information). Design process 310 may further include, for example, standard circuit design processes such as timing analysis, verification, design rule checking, place and route operations, etc. One of ordinary skill in the art of integrated circuit design can appreciate the extent of possible electronic design automation tools and applications used in design process 310 without deviating from the scope and spirit of the invention. The design structure of the invention is not limited to any specific design flow.

Design process 310 preferably translates an embodiment of the invention as shown in [FIG. 1A], along with any additional integrated circuit design or data (if applicable), into a second design structure 390. Design structure 390 resides on a storage medium in a data format used for the exchange of layout data of integrated circuits (e.g., information stored in a GDSII (GDS2), GL1, OASIS, or any other suitable format for storing such design structures). Design structure 390 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in [FIG. 1A]. Design structure 390 may then proceed to a stage 395 where, for example, design structure 390: proceeds to tape-out, is released to manufacturing, is released to a mask house, is sent to another design house, is sent back to the customer, etc.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of initializing a computer memory that receives data from a plurality of redrive buffers, comprising the actions of:
   a. storing in selected redrive buffers of the plurality of redrive buffers a predetermined data pattern of a selected set of data patterns, wherein each of the selected set of data patterns includes a first initialization data pattern and an error correcting code pattern that is a product of a logical function that operates on the first initialization data pattern and an address in the computer memory, the selected set of data patterns including each possible value of error correcting code pattern;
   b. when sending a first initialization data pattern to a selected address, selecting a redrive buffer of the plurality of redrive buffers that has stored therein an error correcting code pattern that corresponds to the selected address; and
   c. instructing the selected redrive buffer to write to the selected address the first initialization data pattern and the error correcting code pattern that corresponds to the selected address.

2. The method of claim 1, wherein the logical function produces four different error correcting code patterns and wherein four different redrive buffers store each possible combination of the first initialization data pattern and error correcting code patterns.

3. The method of claim 1, wherein the first initialization data pattern consists of all 0's.

4. The method of claim 1, further comprising the actions of:
   a. storing in selected redrive buffers of the plurality of redrive buffers a predetermined data pattern of a selected set of data patterns, wherein each of the selected set of data patterns includes a second initialization data pattern and an error correcting code pattern that is a product of a logical function that operates on the second initialization data pattern and an address in the computer memory, the selected set of data patterns including each possible value of error correcting code pattern;
   b. when sending an initialization data pattern of the second set of initialization patterns to a selected address, selecting a redrive buffer of the plurality of redrive buffers that has stored therein an error correcting code pattern that corresponds to the selected address; and
   c. instructing the selected redrive buffer to transmit to the selected address the second initialization data pattern and the error correcting code pattern that corresponds to the selected address.

5. The method of claim 4, wherein the logical function produces four different error correcting code patterns and wherein four different redrive buffers store each possible combination of the second initialization data pattern and error correcting code patterns.

6. The method of claim 4, wherein the second initialization data pattern consists of all 1's.

7. An initialization circuit for a computer memory, comprising:
   a. a plurality of redrive buffers, each buffer of the plurality of redrive buffers having stored thereon an initialization data pattern and a different error correcting code pattern, each error correcting code pattern corresponding to a set of addresses in the computer memory; and
   b. a controller that is configured to initialize a selected address in the computer memory by instructing a selected redrive buffer of the plurality of redrive buffers that has stored therein the error correcting code that corresponds to the selected address to write the initialization data pattern and the error correcting code stored therein to the selected address.

8. A design structure embodied in a non-transitory machine readable medium used in a design process for an initialization circuit for a computer memory, the design structure comprising:
   a. a plurality of redrive buffers, each buffer of the plurality of redrive buffers having stored thereon an initialization data pattern and a different error correcting code pattern, each error correcting code pattern corresponding to a set of addresses in the computer memory; and b. a controller that is configured to initialize a selected address in the computer memory by instructing a selected redrive buffer of the plurality of redrive buffers that has stored therein the error correcting code that corresponds to the selected address to write the initialization data pattern and the error correcting code stored therein to the selected address.

9. The design structure of claim 8, wherein the design structure comprises a netlist, which describes the circuit.

10. The design structure of claim 8, wherein the design structure resides on storage medium as a data format used for the exchange of layout data of integrated circuits.

11. The design structure of claim 8, wherein the design structure includes at least one of test data files, characterization data, verification data, or design specifications.

* * * * *